July 29, 1952 M. E. SMITH 2,605,115
BALL AND SOCKET COUPLING
Filed Oct. 7, 1949
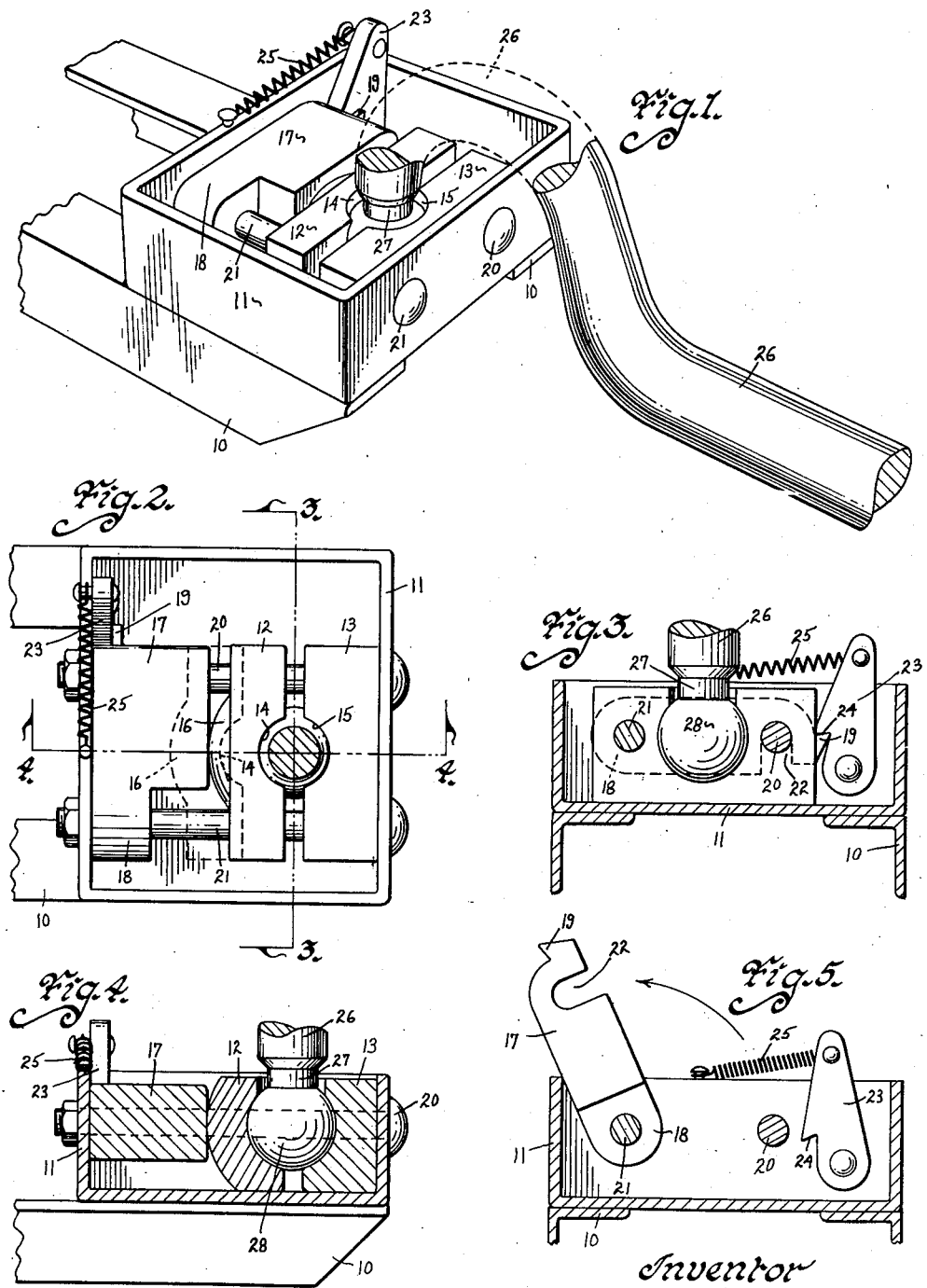
Witness
Edward P. Seeley
Inventor
Merle E. Smith
by M. Talbert Dick
Attorney Patented July 29, 1952

2,605,115

UNITED STATES PATENT OFFICE 2,605,115

BALL AND SOCKET COUPLING

Merle Edwin Smith, Des Moines, Iowa

Application October 7, 1949, Serial No. 120,022

1 Claim. (Cl. 280—33.17)

This invention relates to hitches and more specifically to hitches used on the rear end of automobiles for attaching trailers, trailer houses, wagons and like.

The employment of hitches for such purposes is very old. However, the chief difficulties experienced with most such hitches are that they are not positive in locked position, are difficult to uncouple, and do not possess an unsplit socket bearing directly to the rear of the connecting ball.

Therefore, one of my principal objects is to provide a positive locking hitch and one that may be easily and quickly coupled or uncoupled.

Another object of this invention is to provide a hitch that can be secured to a vehicle such as an automobile, tractor or the like and that is constructed so as to prevent any accidental release of the trailer or the like that is hitched thereto.

A further object of this invention is to provide a hitch that can be easily and quickly attached to or detached from a trailer or the like.

A still further object of this invention is to provide a trailer hitch that is simple in construction and efficient in operation.

These and other objects will be apparent to those skilled in the art.

My invention consists in the construction, arrangement, and combination of the various parts of the device, whereby the objects contemplated are attained as hereinafter more fully set forth, pointed out in my claim, and illustrated in the accompanying drawings, in which:

Fig. 1 is a perspective view of this hitch shown secured to the rear supporting surface of a tractor vehicle and further showing in position the hitch bar of a vehicle to be towed, Fig. 2 is a top view of the hitch of Fig. 1 with the dotted lines indicating the position to which one of the bar members is slidable, Fig. 3 is a cross-sectional view of this device taken on the line 3—3 of Fig. 2 and showing the hitch bar locked in place, Fig. 4 is a cross-sectional view of this device taken on the line 4—4 of Fig. 2, and Fig. 5 is a cross-sectional view of this device similar to that of Fig. 3 but showing the position of the hitch when it is unlocked and the hitch bar is removed.

Referring to the drawings I have used the numeral 10 to designate a support member to which my hitch is secured. This support member may be the frame or bumper of an automobile, a portion of a tractor frame or the like. The numeral 11 designates a rectangular housing having an open top. The bottom of the housing 11 is secured to the support member 10 as shown in Fig. 1. The numerals 12 and 13 respectively designate adjacent bar members with each member provided with a centrally positioned semicircular transverse groove or cut away portion 14 and 15 respectively which are complementary to each other to form a ball socket. The side of the bar member 12 opposite the groove 14 is provided with the outwardly extending bulge portion 16. The numeral 17 designates a stop bar member having the projecting arm portion 18 on one end and the hook member 19 on the other end, as shown in Fig. 1 and Fig. 3. The bar members 12, 13 and 17 are positioned within the housing 11 with the bar 13 towards the rear, the bar 12 adjacent the bar 12 and the stop bar 17 at the front of the housing adjacent the bar 12. Each of the bars 12, 13 and 17 are held in place within the housing 11 by means of the spaced apart shaft bolts and nuts 20 and 21, as shown in Fig. 2. The bar 12 is slidable on the shafts 20 and 21 as indicated by the dotted lines in Fig. 2. The bottom of the right side of the stop bar 17 is provided with the slot 22 that is designed to rest on the shaft bolt 20 as shown in Fig. 3. The arm 18 of the stop bar 17 is hingeably arranged on the shaft bolt 21 so that the stop bar 17 can be raised at times to the position shown in Fig. 5.

A catch member 23 provided with a hook portion 24 is pivotally secured to the right side of the front of the housing 11 so that the hook 24 is capable of engaging the hook 19 on the stop bar 17, as shown in Fig. 3. A coil spring 25 is secured at one end to the top of the catch 23 and at its other end to the top edge of the front of the housing 11 so that tension of the spring will normally hold the hook 24 in engagement with the hook 19, as shown in Fig. 3.

The numeral 26 designates a hitch arm designed to be secured to a trailer or the like. The free end of the hitch bar 26 is bevelled inwardly to form the reduced portion 27 to which there is secured the ball member 28.

When this device is constructed and arranged as described it will operate in the following manner:

To prepare this hitch for receiving the hitch arm of any vehicle to be towed, the top of the catch 26 is manually pushed laterally toward the right of the housing 11 to disengage the hooks 24 and 19. When this is done the stop bar 17 can be manually raised to the position shown in Fig. 5 thus making it possible to slide the bar 12 forwardly and thus enlarge the opening formed by the adjacent grooves 14 and 15.

The ball portion 28 on the free end of the hitch arm 26 can then be placed in the well formed by the grooves 14 and 15 in the bars 12 and 13 respectively.

Due to the slidable fetaure of bar 12, the ball 28 can easily be placed in position since ample room is provided so that it is not necessary to steer the ball portion into or onto any unduly restricted area or surface. Another advantage of this hitch is that ball hitches of varying sizes can be locked in place without danger of coming loose. After the ball portion is in position the bar 12 is moved toward the bar 13 and the stop bar 17 is dropped into place on the pin 20 where the hooks 24 and 19 will engage each other as previously described. As the stop bar 17 is dropped it will contact the bulge portion 16 of the bar 12 and because of the rounded surface of the bulge portion this contact will cause the bar 12 to move toward the bar 13. In this position the grooves 14 and 15 provide a nesting place or socket for the ball 28 as shown in Fig. 4 and the outer edge of the bulge portion 16 on the bar 12 is in contact with the stop bar 17. Thus arranged the bar 12 is incapable of moving and the hitch arm is securely locked in place. The catch 23 is sufficient to hold the stop bar 17 in place and any force from the ball 28 against the bar 12 is taken by the stop bar 17 so that it is impossible for the hitch arm to be accidentally jarred loose. To remove the hitch arm, the procedure above described for inserting it is repeated.

Some changes may be made in the construction and arrangement of my hitch without departing from the real spirit and purpose of my invention, and it is my intention to cover by my claim, any modified forms of structure or use of mechanical equivalents which may be reasonably included within their scope.

I claim:

In a hitch, a rectangular frame that is adapted to be secured to a vehicle, a pair of spaced parallel shafts each having one of their respective ends secured to one side of said frame and the other of their respective ends secured in the other side of said frame, a first block on said shafts and abutting said other side of said frame, a second block slidably mounted on said shafts adjacent to said first block; said first and second blocks having complementary cut-out half socket portions in their adjacent sides, a third block rotatably secured to one of said shafts to selectively limit and free the movement of said second block, and a releasable catch means to secure said third block in its second block limiting position.

MERLE EDWIN SMITH.

REFERENCES CITED

The following references are of record in the file of this patent:

UNITED STATES PATENTS

| Number | Name | Date |
|---|---|---|
| 2,166,738 | Bradley | July 18, 1939 |
| 2,435,019 | Scott | Jan. 27, 1948 |